United States Patent
Priyanto et al.

(10) Patent No.: US 10,143,013 B2
(45) Date of Patent: Nov. 27, 2018

(54) APPARATUS, SYSTEMS AND METHODS FOR USER EQUIPMENT (UE) COVERAGE ENHANCEMENT LEVEL DEFINITION, SELECTION AND ALLOCATION

(71) Applicant: Sony Mobile Communications Inc., Tokyo (JP)

(72) Inventors: Basuki Priyanto, Lund (SE); Linh Trang, Lund (SE); Rickard Ljung, Helsingborg (SE); Anders Berggren, Lund (SE)

(73) Assignee: Sony Mobile Communications Inc., Tokyo (JP)

(*) Notice: Subject to any disclaimer, the term of this patent is extended or adjusted under 35 U.S.C. 154(b) by 96 days.

(21) Appl. No.: 14/992,457

(22) Filed: Jan. 11, 2016

(65) Prior Publication Data

US 2017/0099682 A1    Apr. 6, 2017

Related U.S. Application Data

(60) Provisional application No. 62/236,623, filed on Oct. 2, 2015.

(51) Int. Cl.
*H04W 4/00* (2018.01)
*H04W 74/08* (2009.01)
(Continued)

(52) U.S. Cl.
CPC ...... *H04W 74/0833* (2013.01); *H04W 24/08* (2013.01); *H04W 72/04* (2013.01);
(Continued)

(58) Field of Classification Search
CPC .......................... H04W 74/0833; H04W 72/02
See application file for complete search history.

(56) References Cited

U.S. PATENT DOCUMENTS

2015/0117233 A1    4/2015 Wong et al.
2016/0295609 A1*  10/2016 Vajapeyam ............... H04L 5/14
2016/0373943 A1*  12/2016 Wang ...................... H04W 24/02

FOREIGN PATENT DOCUMENTS

WO    2015042866 A1    4/2015
WO    2015116870 A1    8/2015

OTHER PUBLICATIONS

KDDI Corporation: "Discussion on configuration at coverage enhancement level", 3GPP Draft; R1-153152_MTC_CE_V2, 3rd Generation Partnership Project (3GPP), Mobile Competence Centre ; 650, Route Des Lucioles ; F-06921 Sophia-Antipolis Cedex; France, vol. RAN WG1, No. Fukuoka, Japan; May 25, 2015-May 29, 2015, May 24, 2015, XP050972451, Retrieved from the Internet: URL:http://www.3gpp.org/ftp/Meetings_3GPP_SYNC/RAN1/Docs/ [retrieved on May 24, 2015].

(Continued)

*Primary Examiner* — Omoniyi Obayanju
(74) *Attorney, Agent, or Firm* — Tucker Ellis LLP

(57) ABSTRACT

Systems, apparatus, methods, computer program products and the like provide for updating the CE (Coverage Enhancement)-level of a User Terminal/Equipment (UE). The UE may be a NB-IoT (Narrow Band Internet of Things) device, a MTC (Machine Type Communication) device or any other device supporting CE. Embodiments of the invention implement UE selection/re-selection of random access resources and/or base station definition of CE configuration, allocation and/or re-allocation of resources between CE levels.

8 Claims, 10 Drawing Sheets

(51) Int. Cl.
　　　*H04W 24/08*　　　(2009.01)
　　　*H04W 72/04*　　　(2009.01)
　　　*H04W 16/24*　　　(2009.01)
　　　*H04W 4/70*　　　(2018.01)
(52) U.S. Cl.
　　　CPC .............. *H04W 4/70* (2018.02); *H04W 16/24* (2013.01); *H04W 74/0866* (2013.01)

(56) References Cited

OTHER PUBLICATIONS

Sony: "Considerations on PRACH resources for Nb-IoT", 3GPP Draft; R2-160484—NBIOT PRACH, 3rd Generation Partnership Project (3GPP), Mobile Competence Centre ; 650, Route Des Lucioles ; F-06921 Sophia-Antipolis Cedex ; France, vol. RAN WG2, No. Budapest, HU; Jan. 19, 2016-Jan. 21, 2016, Jan. 18, 2016, XP051054771, Retrieved from the Internet: URL:http://www.3gpp.org/ftp/Meetings_3GPP_SYNC/RAN2/Docs/ [retrieved on Jan. 18, 2016].

Interdigital: "Remaining open issues related to Random Access", 3GPP Draft; R2-156622_LC_MTC Random Access Procedure, 3rd Generation Partnership Project (3GPP), Mobile Competence Centre ; 650, Route Des Lucioles ; F-06921 Sophia-Antipolis Cedex ; France vol. RAN WG2, No. Anaheim, US; Nov. 16, 2015-Nov. 20, 2015, Nov. 16, 2015, XP051005988, Retrieved from the Internet: URL:http://www.3gpp.org/ftp/Meetings_3GPP SYNC/RAN2/Docs/ [retrieved on Nov. 16, 2015].

Nokia Networks: "Random access procedure for enhanced coverage UEs", 3GPP Draft; R2-156445 MTC RA, 3rd Generation Partnership Project (3GPP), Mobile Competence Centre ; 650, Route Des Lucioles ; F-06921 Sophia-Antipolis Cedex; France, vol. RAN WG2, No. Anaheim, USA; Nov. 11, 2015-Nov. 20, 2015, Nov. 16, 2015, XP051005858, Retrieved from the Internet: URL:http://www.3gpp.org/ftp/Meetings_3GPP_ SYNC/RAN2/Docs/ [retrieved on Nov. 16, 2015].

International Search Report and Written Opinion; dated Aug. 16, 2016; issued in International Patent Application No. PCT/2016/024743.

Invitation to Pay Additional Fees; dated Jun. 24, 2016; issued in International Patent Application No. PCT/US2016/024743.

International Preliminary Report on Patentability; dated Apr. 12, 2018; issued in International Patent Application No. PCT/2016/024743.

* cited by examiner

APPARATUS, SYSTEMS AND METHODS FOR USER EQUIPMENT (UE) COVERAGE ENHANCEMENT LEVEL DEFINITION, SELECTION AND ALLOCATION

CLAIM OF BENEFIT UNDER 35 U.S.C. § 119

This non-provisional Patent Application claims priority to U.S. Provisional Patent Application Ser. No. 62/236,623, filed Oct. 2, 2015, entitled "APPARATUS, SYSTEMS AND METHODS FOR USER EQUIPMENT (UE) COVERAGE ENHANCEMENT LEVEL SELECTION AND ALLOCATION", which is assigned to the assignee hereof and hereby expressly incorporated by reference herein.

FIELD OF THE INVENTION

In general, embodiments of the invention relate to mobile network and, more particularly, providing for Coverage Enhancement (CE)-level update through implementation of User Equipment (UE) selection/re-selection of random access resources and/or base station (eNodeB or eNB) allocation and/or re-allocation of resources between CE levels.

BACKGROUND

The 3GPP (3$^{rd}$ Generation Partnership Project) has two separate tracks developing a new standard for the Internet of Things (IoT) of Machine Type communications, in which everyday objects are provided with network connectivity. The first track is an LTE (Long Term Evolution) track referred to as MTC (Machine Type Communications) and the second track is a GERAN (GSM (Global System for Mobile Communications)/EDGE (Enhanced Data-rates for Global Evolution) Radio Access Network) track referred to as NB IOT (Narrow Band Internet of Things) formerly known as IoT (Internet of Things). Versions of both tracks address the need for range extension and/or enhanced coverage. 3GPP plans to achieve enhanced coverage with repetitions of transmission, referred to within 3GPP as Coverage Enhancement (CE), and plans to support various CE-levels (e.g., 15 dB enhancements divided into 6 levels). Such CE may be necessary in situations where the UE is beyond normal cell boundaries, such as when located in a below-ground basement of a building.

Current methodologies for CE provide for the base station (i.e., eNB) and the UE (i.e., mobile terminal) to decide on CE-level while being in connected mode. Specifically, when the UE is entering the idle mode, the base station/eNB informs the Mobile Management Entity (MME) which CE-level was used during the connected mode. Thus, current methodologies assume that the CE-level that is stored by the MME will be the CE-level during paging (i.e., while the UE is in idle mode). However, current methodologies are silent as to how the CE-level stored in the MME can be updated during idle mode. Such updating of the CE-level during idle mode is necessary to insure that a MTC/NB IoT device is successfully paged and, in the event the MTC/NB IoT device has better radio conditions, the cellular network benefits from being able to save paging resources (i.e., CE may no longer be required, or a lower CE level may be used).

Typically, when the UE is in idle mode, it periodically listens to cell broadcast signals from a base station logically connected with it. These broadcast signals may provide information such as cell or eNB identification. The UE is also required to listen for specific paging information, such as incoming downlink traffic to the specific UE. However, in the case of uplink traffic initiation, the UE must take initiative to notify the base station regarding its intention to transfer data. This procedure is known as random access.

The random access procedure or mechanism is the mechanism by which the UE pages the eNB to initiate uplink data transfer. Within the random access procedure, the UE sends a specific random access message (or preamble) to the eNB. The timing for the random access message allowed to be sent from the UEs is typically determined by the eNB broadcast system information.

When the UE is an idle mode, the UE takes measurements from the broadcast signal received from the base station. These measurements are typically made during paging occasions. Such occasions occur when the UE must listen for potential network initiated traffic. Based on the measurements, the UE selects a suitable CE level for potential UE-initiated connection setup. Therefore, when the UE initiates the random access mechanism, the UE has already selected a CE level that it believes is suitable.

In some cases, however, the random access message is not received by the eNB or is not discernable by the eNB. Thus, a need exists for improving the random access mechanism.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for idle mode CE (Coverage Enhancement)-level update.

Embodiments of the invention are directed to a method for selecting one or more random access resources each allocated to one of a plurality of Coverage Enhancement (CE) levels including transmitting, by a User Equipment (UE), a first random access message using at least some first resources of the random access resources; determining, by the UE, that the UE has not received a response to the random access message; in response to determining that the UE has not received a response to the random access message, selecting at least some second resources of the random access resources; and transmitting, by the UE, a second random access message using at least the selected second resources.

In some embodiments, the first resources are associated with a first CE level and the second resources are associated with a second CE level. In some such embodiments, the second CE level corresponds to a higher CE level than the first CE level. In other such embodiments, the first CE level and the second CE level are the same CE level and the selected second resources have been allocated to the same CE level as the first resources after transmission of the first random access message.

In other such embodiments, the method also includes prior to selecting at least some second resources of the random access resources, listening, by the UE, for updated system information from a base station, wherein the updated system information indicates the base station has allocated at least some additional resources to the first CE level; and receiving the updated system information. In some such embodiments, the method also includes in response to receiving the updated system information, selecting the at least some additional resources as the second resources.

In some embodiments, transmitting the first random access message comprises transmitting a plurality of first message transmissions at a first number of repetitions within first predefined resources comprising time and/or frequency resources; and transmitting the second random access message comprises transmitting a plurality of second message transmissions at a second number of repetitions within second predefined resources comprising time and/or frequency resources, wherein the first predefined resources and the second predefined resources are the same resources or different resources. In some such embodiments, the first resources are associated with a first CE level and the second resources are associated with a second CE level; and the first number of repetitions is lower than the second number of repetitions.

In some embodiments, the method also includes prior to transmitting the first random access message, determine an initial CE level based at least in part on a signal strength measurement or a signal quality measurement of a broadcast pilot signal from a base station. In some such embodiments, the method also includes based on the determined initial CE level, select at least one resource allocated to the initial CE level.

According to embodiments of the invention, a method for allocating at least one resource of one or more random access resources to one of a plurality of Coverage Enhancement (CE) levels includes determining, by a base station, a User Equipment (UE) may have difficulty communicating with the base station; determining a first resource, by the base station, which the UE is attempting to use to transmit a random access message; determining, by the base station, a CE level to which the first resource is allocated; and allocating, by the base station, at least one additional resource to the determined CE level or a higher CE level than the determined CE level.

In some embodiments, determining the UE may have difficulty communicating with the base station comprises determining a noise level caused by too many UEs transmitting at the same time.

In some embodiments, determining the UE may have difficulty communicating with the base station comprises determining a CE level selected by the UE is too low for successful receipt of the random access message by the base station. In some such embodiments, the method also includes allocating, by the base station, at least one additional resource to a higher CE level than the CE level selected by the UE; and transmitting, by the base station, a broadcast signal comprising updated system information indicating the allocation of the at least one additional resource to the higher CE level.

According to embodiments of the invention, a user equipment (UE) apparatus for selecting one or more random access resources each allocated to one of a plurality of Coverage Enhancement (CE) levels includes a computing platform including a memory and a processor in communication with the memory; and a random access mechanism application stored in the memory, executable by the processor, and configured to transmit, a first random access message using at least some first resources of the random access resources; determine that the UE has not received a response to the random access message; in response to determining that the UE has not received a response to the random access message, select at least some second resources of the random access resources; and transmit a second random access message using at least the selected second resources.

In some embodiments, the first resources are associated with a first CE level and the second resources are associated with a second CE level. In some such embodiments, the second CE level corresponds to a higher CE level than the first CE level.

According to embodiments of the invention, a base station apparatus for allocating at least one resource of one or more random access resources to one of a plurality of Coverage Enhancement (CE) levels, the base station apparatus comprising a memory, a processor in communication with the memory and a random access mechanism application stored in the memory, executable by the processor and configured to determine a User Equipment (UE) may have difficulty communicating with the base station; determine a first resource which the UE is attempting to use to transmit a random access message; determine a CE level to which the first resource is allocated; and allocate at least one additional resource to the determined CE level or a higher CE level than the determined CE level.

In some embodiments, determining the UE may have difficulty communicating with the base station comprises determining a noise level caused by too many UEs transmitting at the same time.

In some embodiments, determining the UE may have difficulty communicating with the base station comprises determining a CE level selected by the UE is too low for successful receipt of the random access message by the base station. In some such embodiments, the random access mechanism application stored in the memory and executable by the processor is further configured to allocate at least one additional resource to a higher CE level than the CE level selected by the UE; and transmit a broadcast signal comprising updated system information indicating the allocation of the at least one additional resource to the higher CE level.

According to embodiments of the invention, a method for selecting a Coverage Enhancement (CE) level from a plurality of CE levels includes determining, by a User Equipment (UE), a matching Coverage Enhancement (CE) level from a plurality of CE levels matching the UE; determining, by the UE, that the matching CE level is not defined in a CE configuration or has no available allocated Physical Random Access Channel (PRACH) resources; determining, by the UE, a new CE level from the plurality of CE levels, wherein the new CE level is the next highest available CE level from the plurality of CE levels; and transmitting, by the UE, using the determined new CE level.

In some embodiments, the method includes determining, by the UE, that the matching CE level is not defined in a CE configuration. In some such embodiments, the method also includes receiving the CE configuration from a base station, wherein the CE configuration indicates a number of CE levels in the plurality of CE levels and random access resource allocations (time/frequency) corresponding to each of the number of CE levels; and determining the matching CE level is not defined in a CE configuration is based on the received CE configuration.

In some embodiments, determining a matching CE level comprises performing a measurement and matching the performed measurement with one of the CE levels from the plurality of CE levels, resulting in the matching CE level. In some such embodiments, performing the measurement comprises performing a Reference Signal Received Power (RSRP) measurement.

In some embodiments, the method includes determining, by the UE, that the matching CE level has no available allocated PRACH resources.

According to embodiments of the invention, a user equipment (UE) apparatus for selecting a Coverage Enhancement (CE) level from a plurality of CE levels includes a computing platform including a memory and a processor in communication with the memory; and a random access mechanism application stored in the memory, executable by the processor, and configured to determine a matching Coverage Enhancement (CE) level from a plurality of CE levels matching the UE; determine that the matching CE level is not defined in a CE configuration or has no available allocated Physical Random Access Channel (PRACH) resources; determine a new CE level from the plurality of CE levels, wherein the new CE level is the next highest available CE level from the plurality of CE levels; and transmit using the determined new CE level.

In some embodiments, the random access mechanism application stored in the memory, executable by the processor, and configured to determine that the matching CE level is not defined in a CE configuration. In some such embodiments, the random access mechanism application stored in the memory, executable by the processor, is further configured to receive the CE configuration from a base station, where the CE configuration indicates a number of CE levels in the plurality of CE levels and random access resource allocations (time/frequency) corresponding to each of the number of CE levels; and determining the matching CE level is not defined in a CE configuration is based on the received CE configuration.

In some embodiments, determining a matching CE level comprises performing a measurement and matching the performed measurement with one of the CE levels from the plurality of CE levels, resulting in the matching CE level. In some such embodiments, performing the measurement comprises performing a Reference Signal Received Power (RSRP) measurement.

In some embodiments, the random access mechanism application stored in the memory, executable by the processor, and configured to determine that the matching CE level has no available allocated PRACH resources. According to embodiments of the invention, a method for allocating Physical Random Access Channel (PRACH) resources to a plurality of Coverage Enhancement (CE) levels includes determining, by a base station, that a utilization of PRACH resources allocated to a first CE level of the plurality of CE levels is greater than an acceptable threshold; in response, determining, by the base station, that additional PRACH resources should be allocated to the first CE level of the plurality of CE levels; and allocating, by the base station, the additional PRACH resources to the first CE level. In some such embodiments, determining that the utilization of resources is greater than an acceptable threshold comprises receiving a plurality of measurements from a plurality of UEs in communication with the base station; classifying each of the plurality of UEs into one of the plurality of CE levels; and determining, based on the classifying, that a utilization of PRACH resources allocated to a first CE level of the plurality of CE levels is greater than an acceptable threshold.

In some embodiments, the method also includes performing, by the base station, conditioning of the plurality of measurements from the plurality of UEs in communication with the base station. In some such embodiments, performing conditioning comprises filtering the plurality of measurements and removing at least a portion of the plurality of measurements.

According to embodiments of the invention, a base station apparatus for allocating Physical Random Access Channel (PRACH) resources to a plurality of Coverage Enhancement (CE) levels, the apparatus includes a computing platform including a memory and a processor in communication with the memory; and a random access mechanism application stored in the memory, executable by the processor, and configured to determine that a utilization of PRACH resources allocated to a first CE level of the plurality of CE levels is greater than an acceptable threshold; and in response, determine that additional PRACH resources should be allocated to the first CE level of the plurality of CE levels; and allocate the additional PRACH resources to the first CE level.

In some embodiments, determining that the utilization of resources is greater than an acceptable threshold comprises receiving a plurality of measurements from a plurality of UEs in communication with the base station; classifying each of the plurality of UEs into one of the plurality of CE levels; and determining, based on the classifying, that a utilization of PRACH resources allocated to a first CE level of the plurality of CE levels is greater than an acceptable threshold.

In some embodiments, the random access mechanism application stored in the memory, executable by the processor, is further configured to perform conditioning of the plurality of measurements from the plurality of UEs in communication with the base station. In some such embodiments, the performing conditioning comprises filtering the plurality of measurements and removing at least a portion of the plurality of measurements.

BRIEF DESCRIPTION OF THE DRAWINGS

Figure 1:
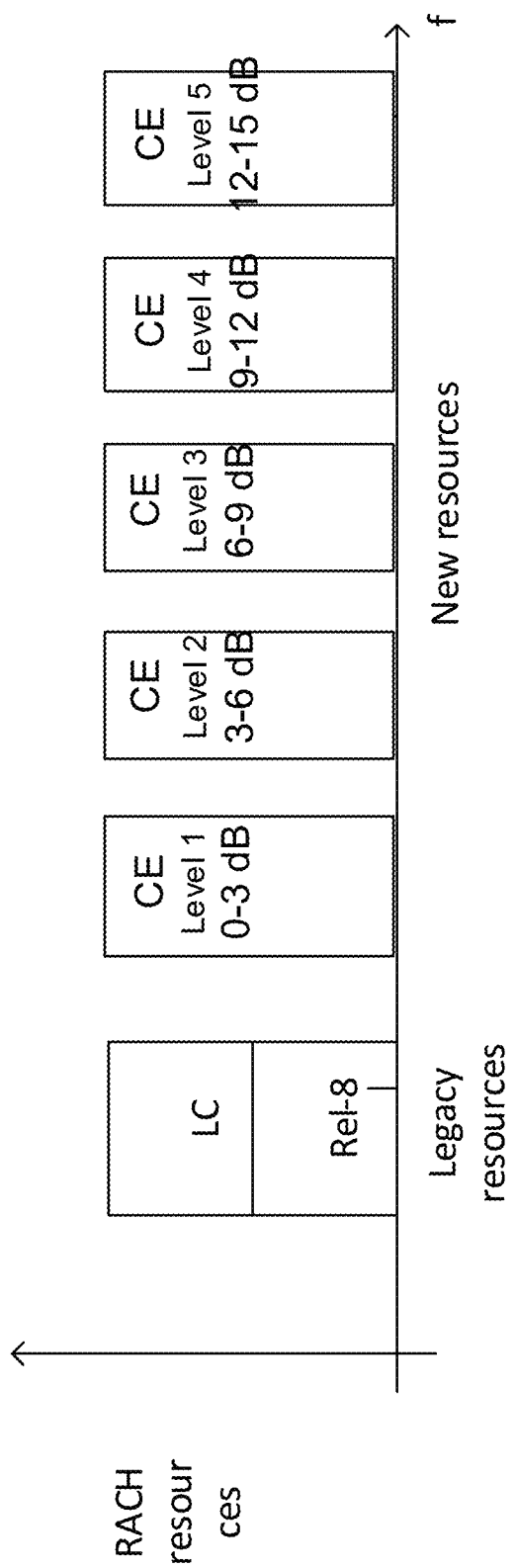

Having thus described embodiments of the invention in general terms, reference will now be made to the accompanying drawings, where:

FIG. 1 is a graph of RACH resources for different CE levels.

Figure 2:
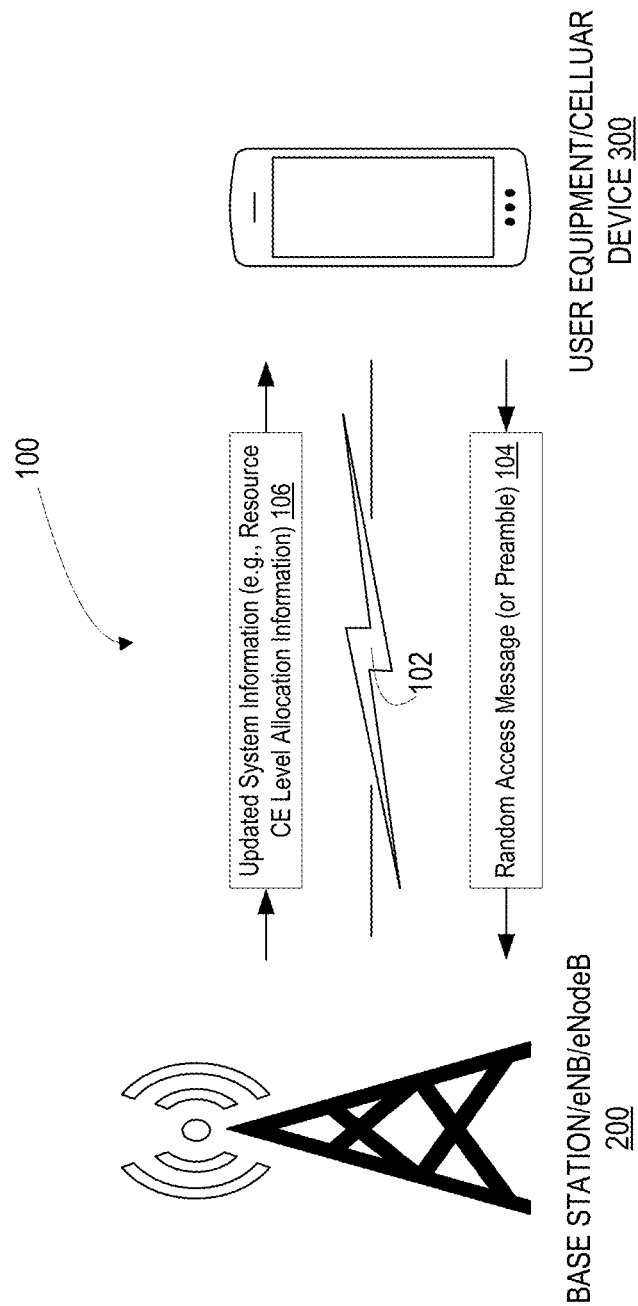
Figure 3:
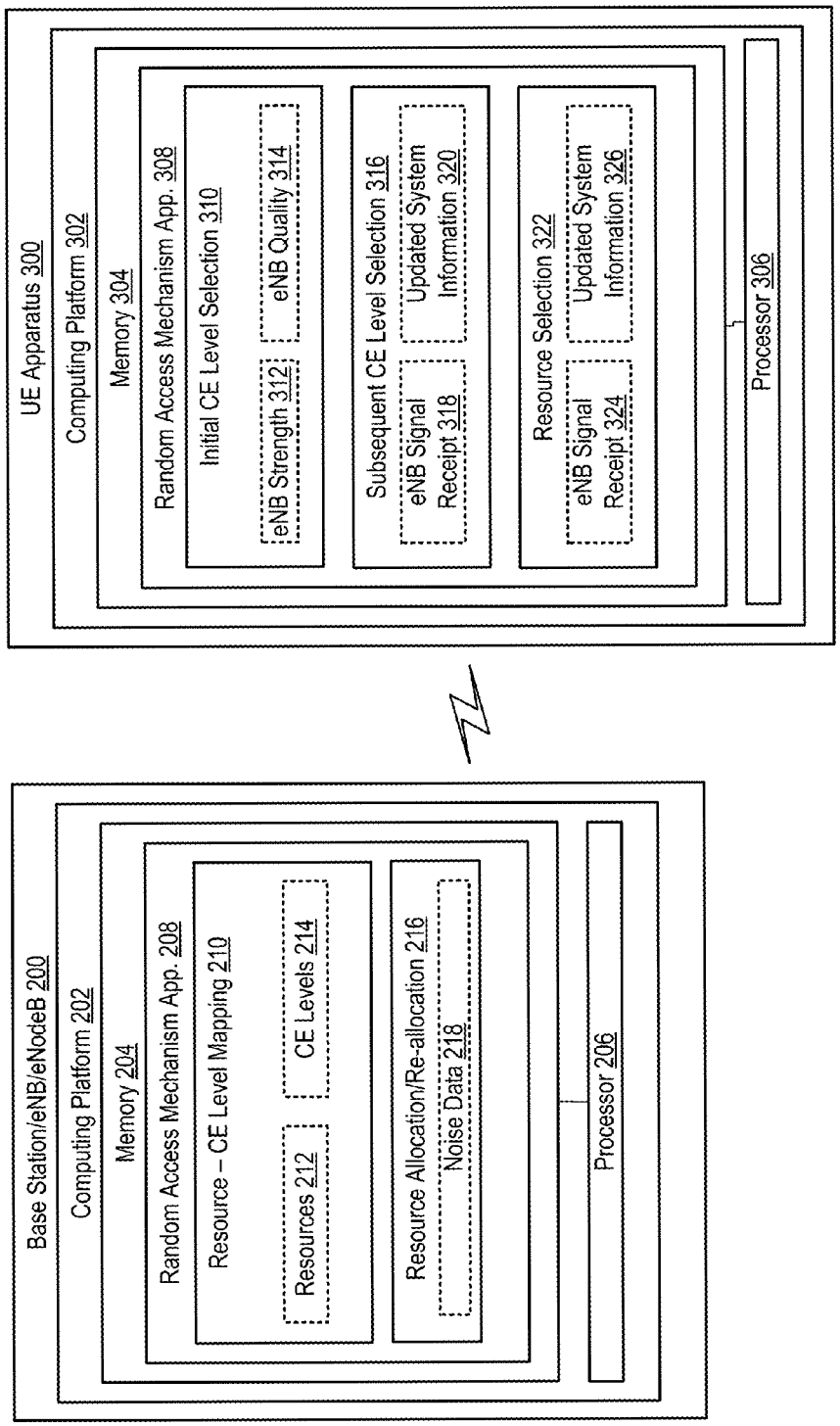
Figure 4:
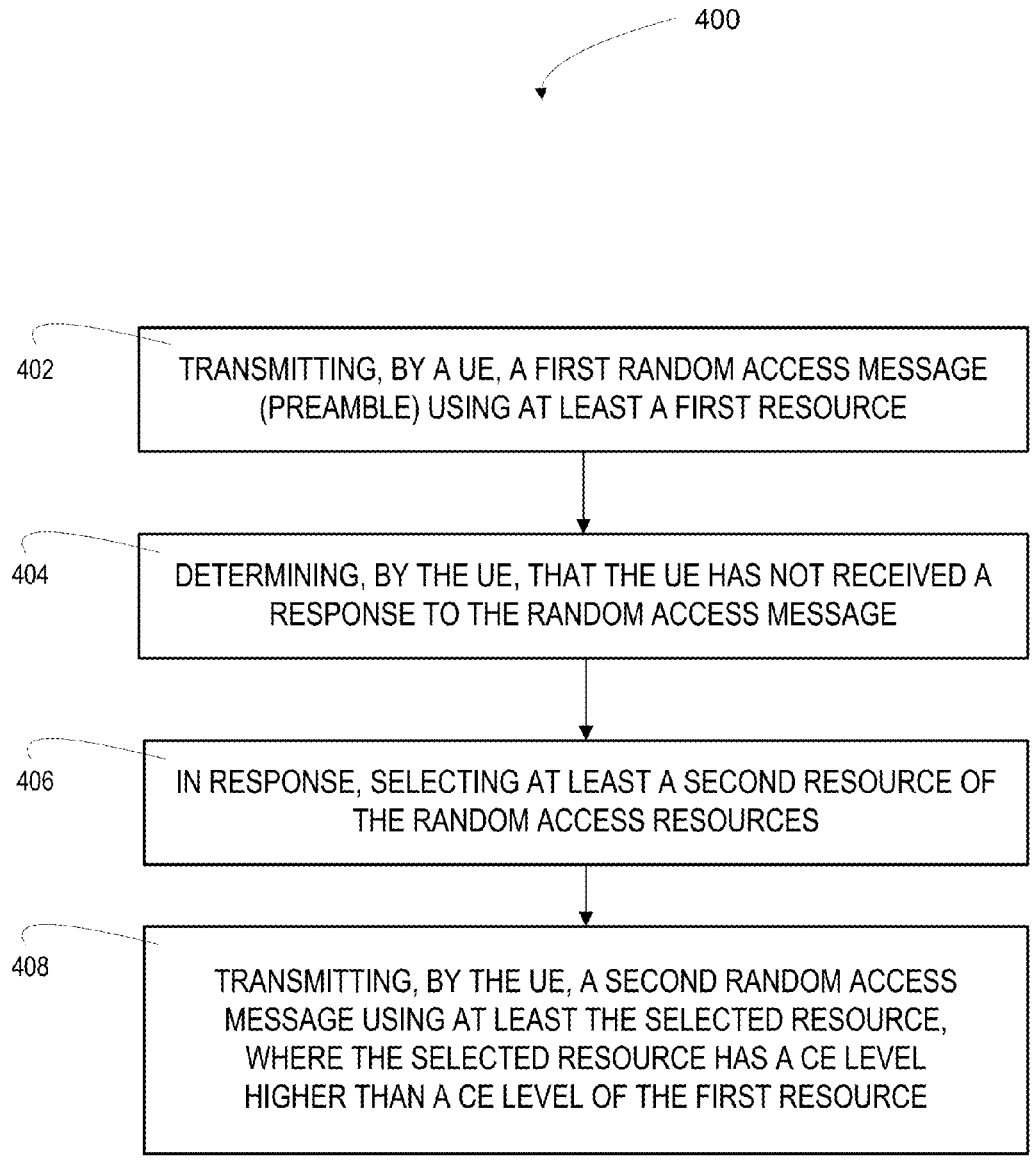
Figure 5:
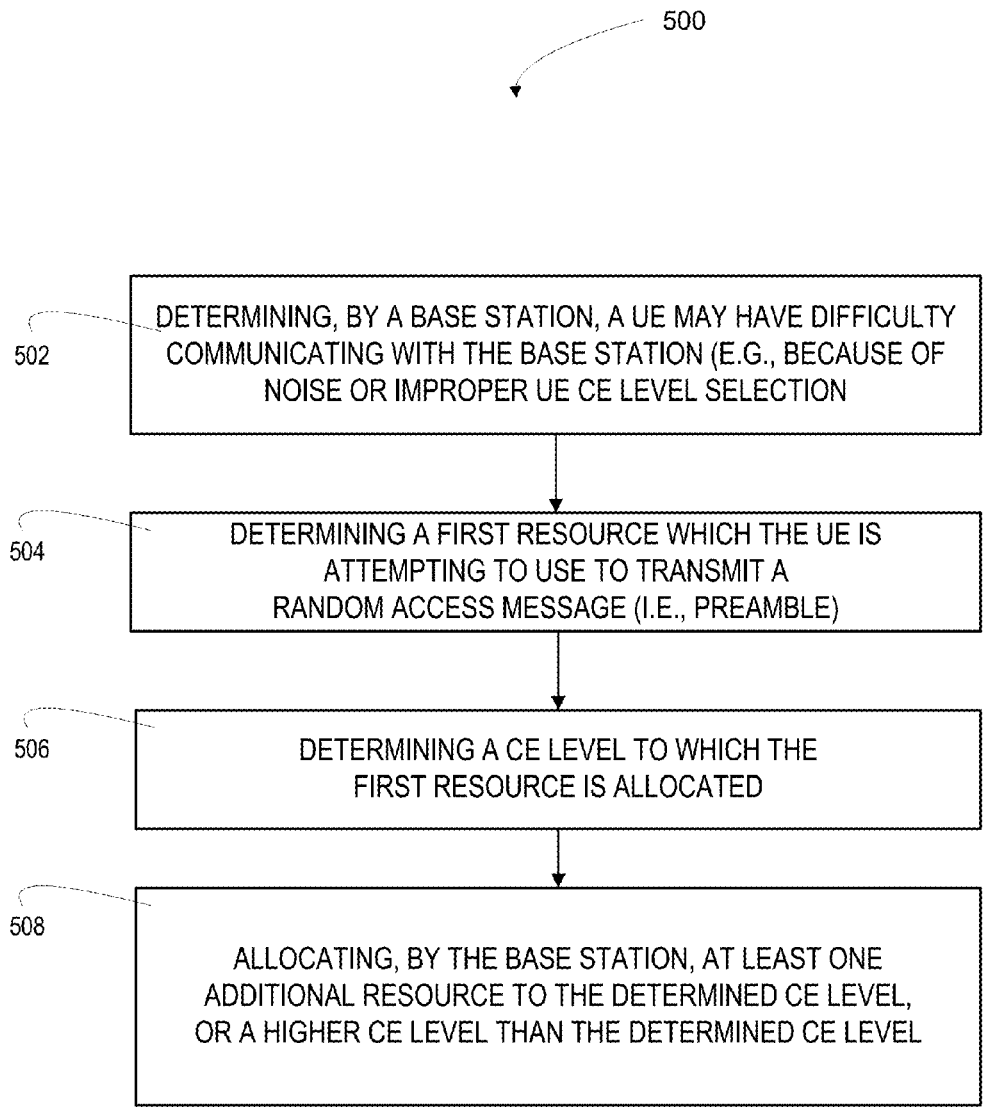
Figure 6:
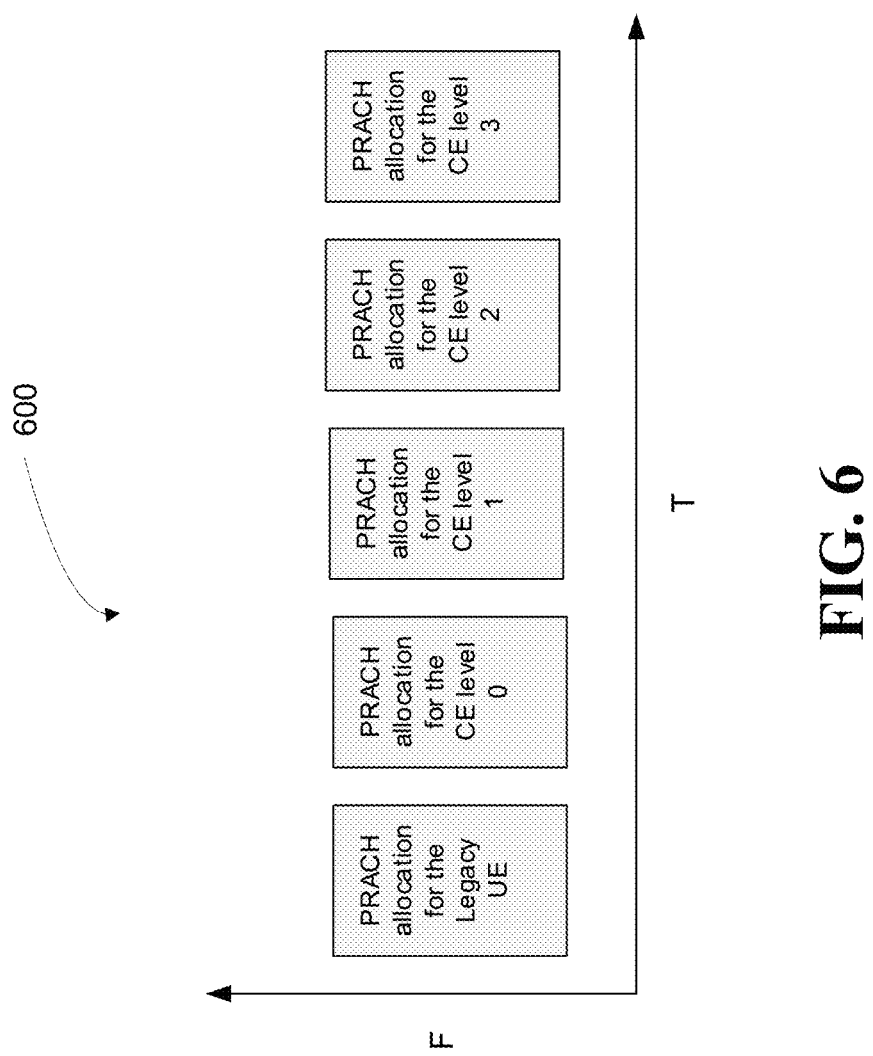
Figure 7:
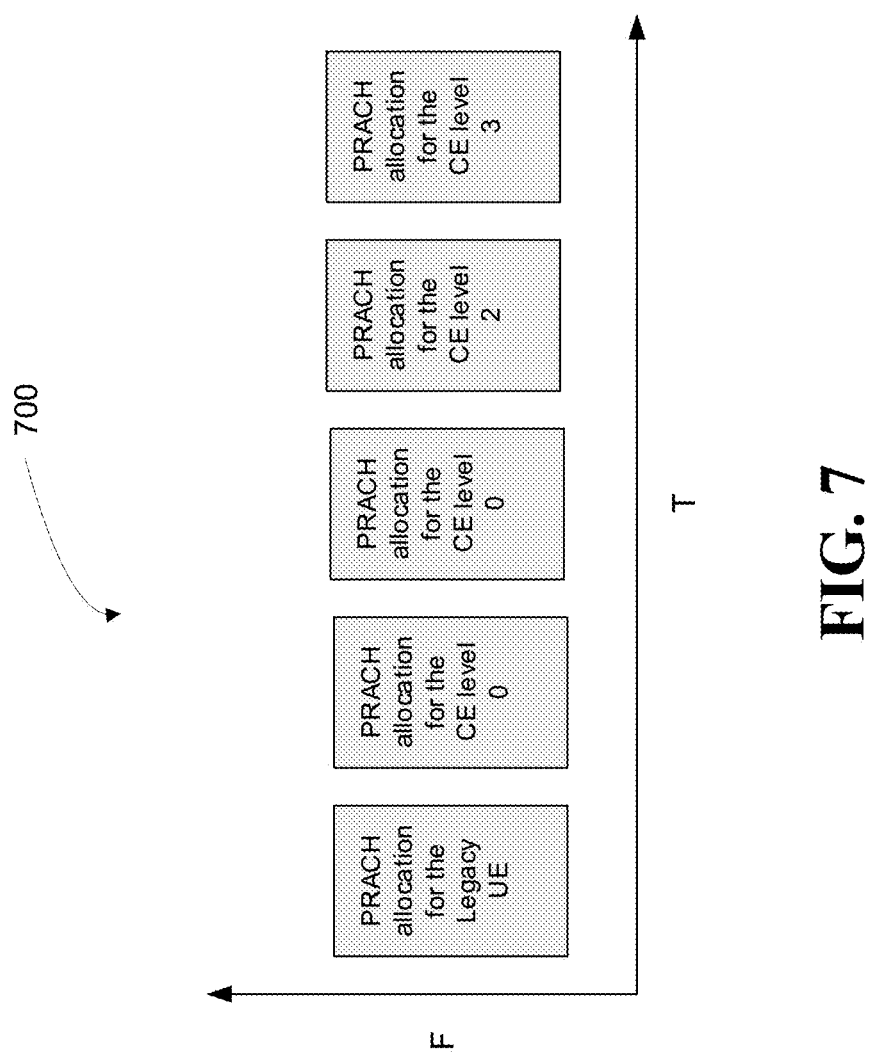
Figure 8:
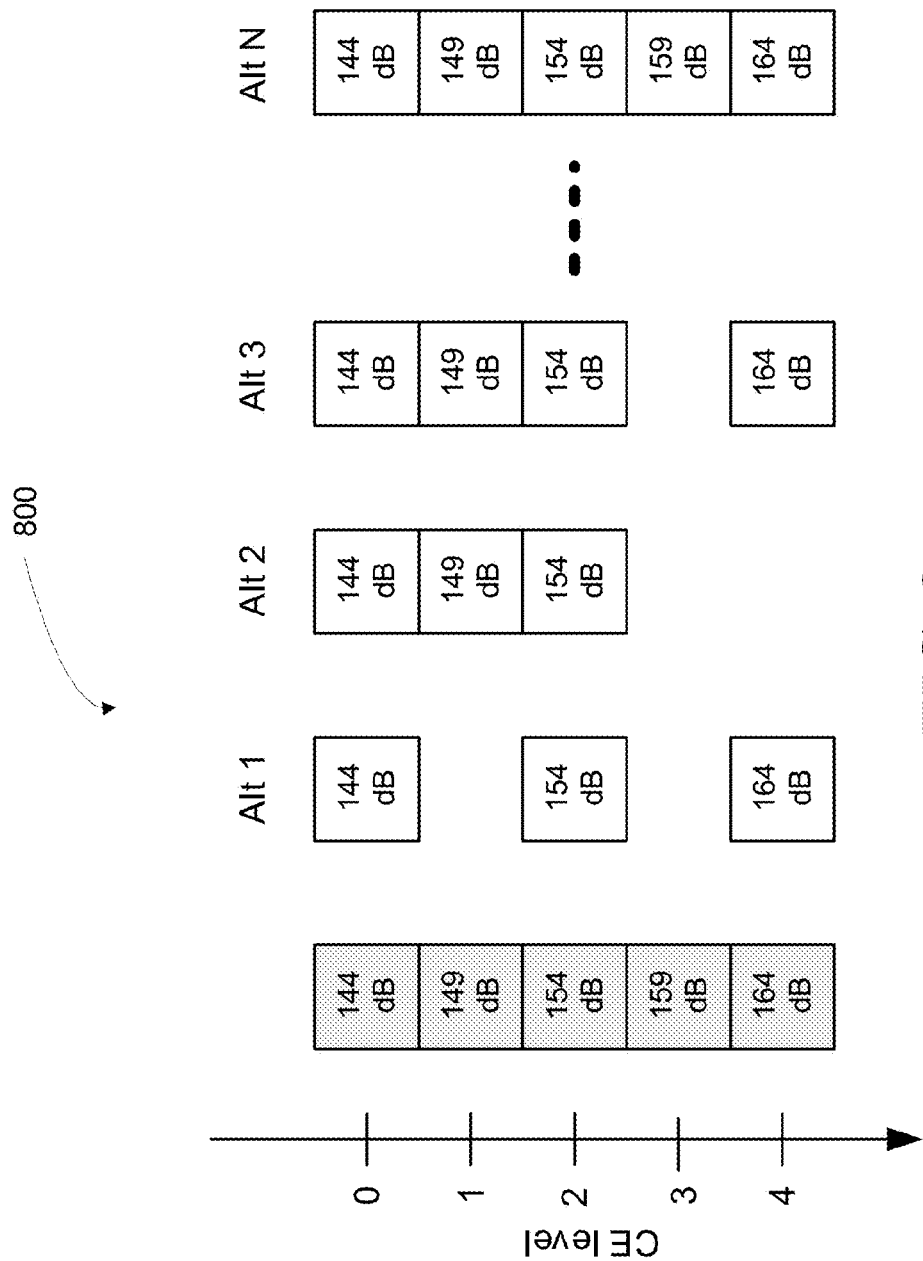
Figure 9:
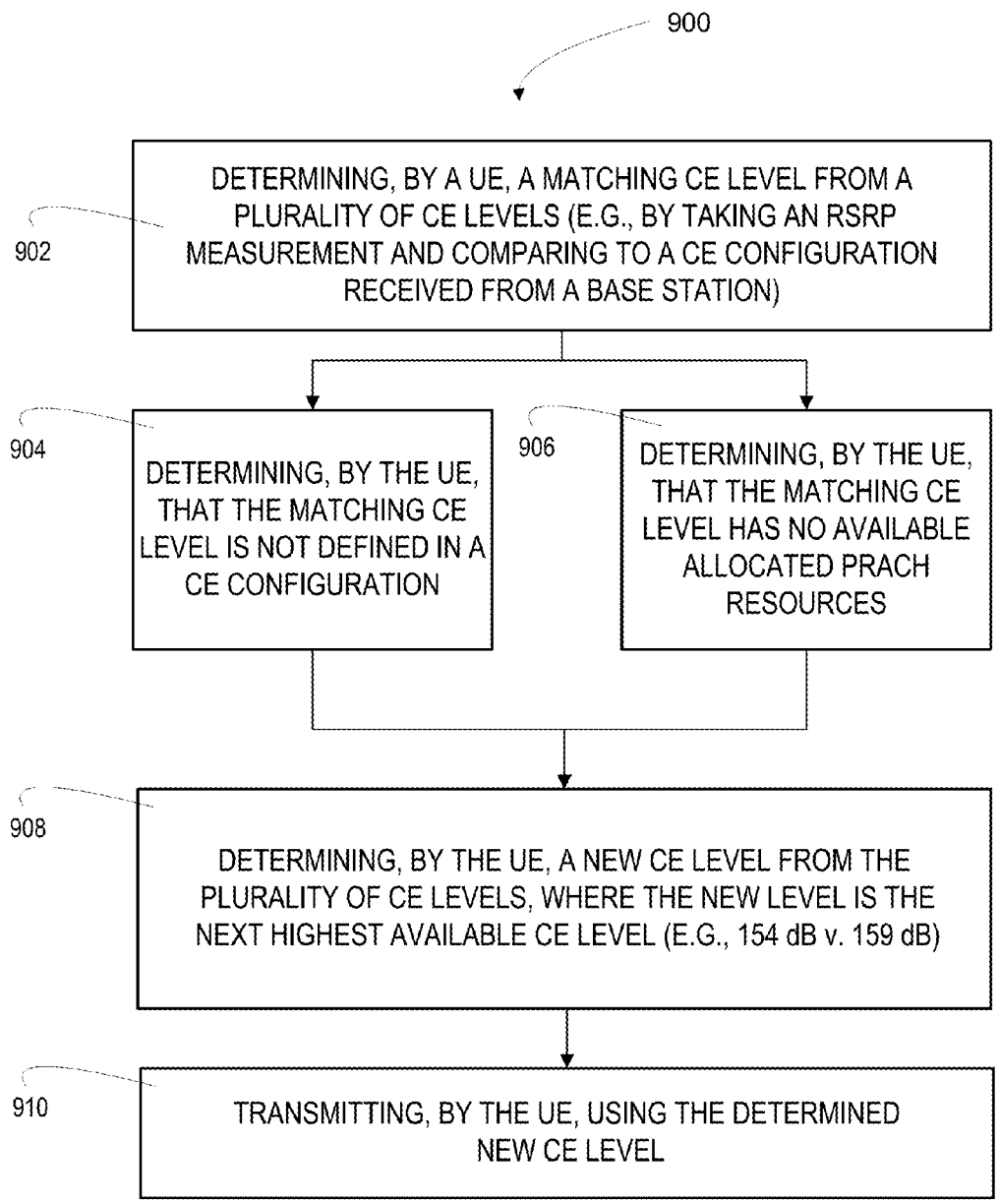
Figure 10:
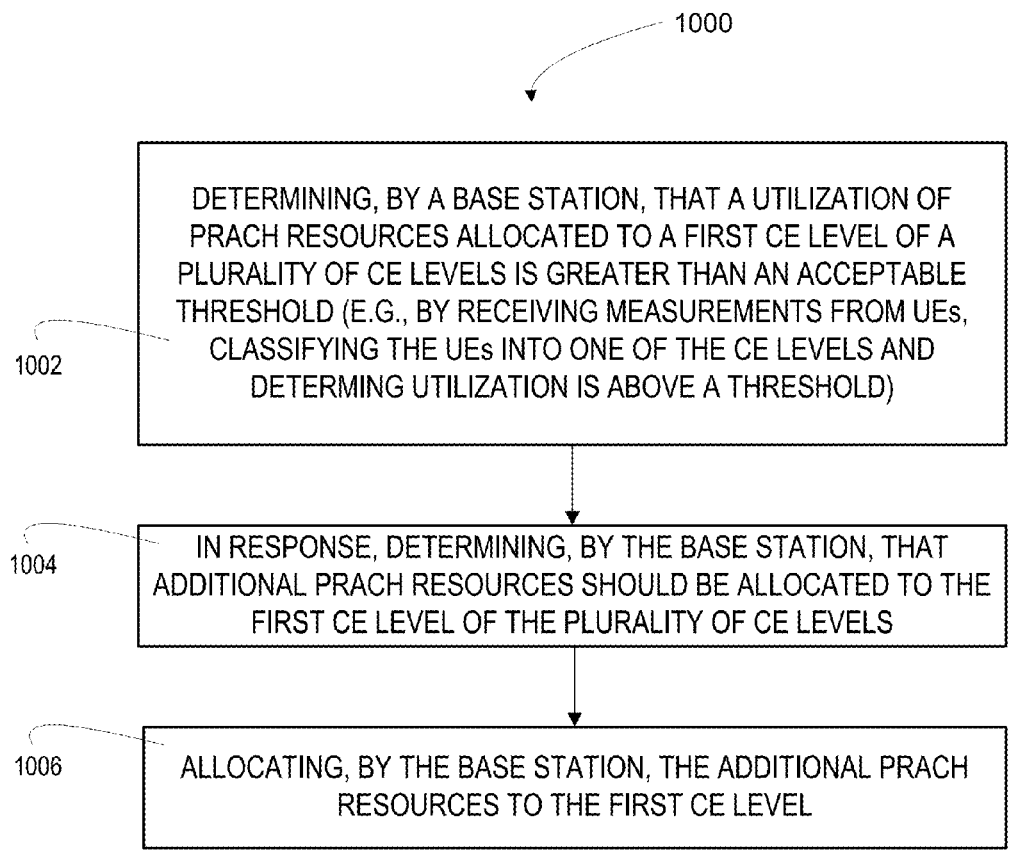

FIG. 2 is a diagram of a system for updating Coverage Enhancement (CE)-level of a UE, in accordance with embodiments of the present invention;

FIG. 3 is a block diagram of a system for updating Coverage Enhancement (CE)-level of a UE, in accordance with embodiments of the present invention;

FIG. 4 is a flow diagram of a method for updating CE-level of a UE, in accordance with embodiments of the present invention;

FIG. 5 is a flow diagram of another method for updating CE-level of a UE, in accordance with embodiments of the present invention;

FIG. 6 is a graph of PRACH resource allocation;

FIG. 7 is a graph of PRACH resource allocation according to embodiments of the invention;

FIG. 8 is a diagram illustrating a flexible CE level configuration according to embodiments of the invention;

FIG. 9 is a flow diagram of a method for selecting a Coverage Enhancement (CE) level from a plurality of CE levels, in accordance with embodiments of the invention; and FIG. 10 is a flow diagram of a method for allocating Physical Random Access Channel (PRACH) resources to a plurality of Coverage Enhancement (CE) levels, in accordance with embodiments of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A device may be referred to as a node or user equipment ("UE"). For the purpose of sending or receiving data, the device may connect to a wireless local area network ("WLAN") or a mobile communication network (including evolution of 3GPP) LTE releases and $5^{th}$ Generation ("5G") LTE releases). Any network described herein may have one or more base stations ("BS/eNB") and/or access points ("AP").

As illustrated in FIG. 1, in the case of MTC with EC there are different random access resource allocations (i.e., PRACH or physical RACH resources) depending on the CE level. During idle mode, and before the random access processing, there is no dedicated signaling between the eNB and the UE, but rather, the only signaling is the broadcast signaling. The UE, in some embodiments, determines a suitable initial CE level on its own. The initial CE level estimation can, in some embodiments, be based on the broadcast signaling strength and/or quality from the eNB.

Notably, the UE does not inform the network when it changes the extended coverage level within a cell or when it changes to another cell while being in extended coverage (unless it changes the tracking area). Accordingly, an individual UE can select and/or re-select its CE level at any time, without the eNB having knowledge or control of the selection/re-selection.

As discussed in detail herein, various embodiments of the invention provide mechanisms (i.e., processes) for Coverage Enhancement (CE)-level update through implementation of User Equipment (UE) selection/re-selection of random access resources and/or base station (eNodeB or eNB) allocation and/or re-allocation of resources between CE levels. The UE may be a NB IoT (NB Internet of Things) device, a MTC (Machine Type Communication) device or other similar device.

Referring to FIG. 2 a block diagram is presented of a system 100 for updating CE-level in a UE, in accordance with embodiments of the present invention. The system includes a UE 300 and a base station/eNodeB 200. The UE 300 may be a NB IoT device, a MTC device or any other device capable of supporting CE. The UE 300 includes a computing platform 302 having a memory 304 and a processor 306 in communication with the memory 304. The memory 304 stores a random access mechanism module or application 308 that is configured to conduct the random access mechanism and/or to select/re-select CE level for the UE in accordance with embodiments of the present invention.

The random access mechanism module 308 is configured to cause the processor 306 to perform one or more of the steps discussed below with reference to FIG. 4 and/or one or more other steps discussed herein and/or others. Specifically, the module 308 is configured to cause the processor 306 to select/re-select one or more random access resources each allocated to one of a plurality of CE levels.

In specific embodiments of the invention, the need to update the network of a CE-level change requires that the CE-level change be a significant change. In such embodiments of the invention, a significant change may be indicative of the UE apparatus 102 moving in to or out of coverage enhancement (CE) mode. Moving out of the CE mode means that UE apparatus can go back to normal paging without a need for repetitions (i.e., a possible need to lower the CE-level) and moving into the CE mode means that the network needs to use CE repetitions in order to successfully page the UE apparatus (i.e., a possible need to increase the CE-level).

In specific embodiments of the invention the CE-level estimation module 110 is configured to perform the CE-level estimation process (i.e., evaluating, determining and updating) prior to, but in conjunction with, a next expected paging window to allow the network time to adjust the CE-level, if needed.

The base station/eNB/eNodeB 200 includes a computing platform 202 having a memory 204 and a processor 206 in communication with the memory 204. The memory 204 may include a random access mechanism module or application 208.

The random access mechanism module 208 is configured to cause the processor 206 to perform one or more of the steps discussed below with reference to FIG. 5 and/or one or more other steps discussed herein and/or others. Specifically, the module 208 is configured to cause the processor 206 to allocate/re-allocate resources 212 to CE levels 214 as discussed herein.

Referring to FIG. 4 a flow diagram is presented of a method 400 for selecting one or more random access resources each allocated to one of a plurality of CE levels. The method 400 includes, as represented by block 402, transmitting, by a UE, a first random access message (preamble) using at least some first resources. In some embodiments, the UE is selecting defined resources from a resource pool, such as those resources available that are allocated to a particular CE level.

The next step, as represented by block 404, is determining, by the UE, that the UE has not received a response to the random access message.

The next step, as represented by block 406, is in response to determining the UE has not received a response to the random access message, selecting at least some second resources. The second resources are selected in order to improve the chances that the random access mechanism has success. This may be done by, in some cases, listening for the broadcast signaling to determine whether additional resources have been allocated to the UE's current CE level, and then using some or all the additional resources if so. Alternatively, this may be done by, in some cases, selecting resources that are allocated to a higher CE level than the UE's current CE level.

The final step, as represented by block 408, is transmitting, by the UE, a second random access message using at least the selected resources. As noted above, the selected resources, in some embodiments, may have a higher CE level than the CE level of the first resources, or the selected resources may be on the same CE level of the first resources, but they may have been recently allocated by the base station as indicated by broadcast signaling received by the UE.

In some embodiments, the first resources are associated with a first CE level and the second resources are associated with a second CE level. Typically, the second CE level is a higher level than the first CE level so that the second attempt at transmission is effective. The first resources, as noted above, are typically selected from a resource pool that belongs (or are allocated) to the first CE level and the second resources are selected from a resource pool that belongs (or are allocated) to the second CE level.

In some embodiments, the first CE level and the second CE level are the same CE level. In such cases, the selected second resources have been allocated by the base station to the same CE level as the first resources after transmission of the first random access message. In some embodiments, when the UE does not receive a response from the base station after transmitting the first random access message, the UE listens to the broadcast signaling to determine whether additional resources have been allocated by the base station to the UE's current CE level. If so, the UE may use some of those resources in a subsequent random access message.

In some embodiments, transmitting the first random access message includes transmitting multiple first message transmissions within predefined resources, such as time, sub-carrier/frequency and/or the like. Transmitting the second random access message may include transmitting multiple second message transmissions within second predefined resources as well. In some cases, the first predefined resources are the same as the second predefined resources, and in some cases, they are different and/or overlap.

In various embodiments, the number of repetitions transmitted regarding the first random access message is the same as the number of repetitions transmitted regarding the second random access message and in some cases it is the same. In a case where the CE level is changed, the number of repetitions may change. For example, if the CE level is increased, then the number of repetitions may increase from the first to the second random access message.

Referring to FIG. 5 a flow diagram is presented of a method 500 for allocating at least one resource of one or more random access resources to one of a plurality of CE levels. In some embodiments, the base station detects a noise or interference level in certain resources, and thereby determines whether the resources allocated to a specific CE level are too high or too low. The base station may then adjust the allocated resources accordingly.

The first step, represented by block 502, is determining, by a base station, a UE may have difficulty communicating with the base station. For example, the base station may be experiencing a high level of noise. The high noise level may be caused by too many UEs attempting to communicate with the base station. The inability to decode a certain UE random access message could also be caused by improper UE CE level selection. Specifically, the eNB cannot decode if SNR (Signal strength from a specific UE divided by noise level from all UE signals) is too low. This can be too low if UE CE level is too low, for example if the received aggregated signal strength from one UE's repetitions is too low or if the noise level is too high (i.e., too many UEs are attempting at the same time). These scenarios can, in some situations, be combined to cause too low an SNR from a particular UE transmission.

The next step, represented by block 504, is determining a first resource which the UE is attempting to use to transmit a random access message (preamble). The next step, represented by block 506, is determining a CE level to which the first resources are allocated. Finally, as represented by block 508, the last step is allocating, by the base station, at least some additional resources to the determined CE level or a higher CE level than the determined CE level.

In various embodiments, a noise or interference level detected by the base station is compared to a predetermined threshold, and if the noise level exceeds the threshold, then the base station may allocate additional resources to the specific CE level experiencing the noise. Conversely, if the detected noise level of a particular CE level is below a certain threshold, then the base station may allocate resources currently in the particular CE level to one or more other CE levels as needed (i.e., based on their respective noise levels). The noise or interference levels may be caused by too many UEs attempting to communicate in a particular CE level, but typically the base station has no way to determine how many UEs are attempting to communicate. Rather, the base station can determine that the noise or interference level is high and infer that many UEs are attempting to communicate in a particular CE level. The base station can move forward with allocation/re-allocation based on the identified noise/interference and then transmit broadcast signaling that indicates the new allocation/re-allocation of resources so that UEs may take advantage of the allocation change.

Adaptive CE Level Activation and/or PRACH Resource Allocation

In Release 13 of LTE, it was agreed that four Physical Random Access Channel (PRACH) CE levels would be used, as shown in the CE level graph 600 of FIG. 6 as CE levels 0, 1, 2 and 3. As discussed above, coverage enhancement may include conducting repetitions in a transmission over the network in order to achieve time diversity and increase total aggregate transmitted signal energy. Thus, a higher CE level (i.e., 1 versus 0) corresponds to an operation with higher number of repetitions in the transmission between an eNB and a UE (e.g., a eMTC device). This ensures that the UE device is able to communicate with the eNB while it is in a CE mode (which may be entered in the event of a very low signal-to-noise scenario, for example).

When a UE initiates a transmission, it starts a random access procedure including RACH transmissions that occur during PRACH resource allocation time slots. In some cases, the eNB broadcasts the PRACH resource allocation information of the CE levels (e.g., the four levels indicated in LTE Release 13) as part of a broadcast system information message, which is received by the UE. The eNB can also broadcast a list of random access preamble configurations that correspond to the CE levels. The UE then can, in some cases, measure the received signal strength (e.g., using a Reference Signal Received Power (RSRP) measurement). Based on the measurement, the UE, in some cases, determines its suitable CE level. When the UE intends to transmit data, it first sends a PRACH preamble message in the allocated PRACH resources for the corresponding CE level.

Practically speaking, the number of UEs is not evenly distributed among each of the different CE levels. Thus, it can be the case that none or a small number of UEs are using a particular CE level. In some instances, the number of UEs in a CE level can become very high, and therefore, the network needs solutions for re-allocating the PRACH resources in a smart way. Embodiments of the invention provide for such re-allocation of PRACH resources over multiple CE levels based on the number of devices in each CE level, thereby increasing network utilization and efficiency.

Referring back to FIG. 6, illustrating a Release 13 configuration, the eNB allocates the PRACH resource allocation for all CE levels and legacy UE. Embodiments of the invention provide that the eNB may find it necessary not to allocate all CE levels; rather, it can retain additional resources for higher CE levels to ensure those UE in extreme conditions (e.g., very low SNR) can still communicate with the eNB. Alternatively, or in combination, in some embodiments, the eNB may consider one or more CE levels full or occupied over a threshold, and in response, re-allocates resources to that CE level.

Referring to FIG. 7, a graph 700 illustrates implementation of an embodiment of the invention. In this example, embodiments of the invention may include an eNB that retains some resources, which would otherwise be allocated to a first CE level, and then can allocate those retained resources to a second CE level. This allocation may be based on a number of triggers or factors. As shown in the example, resources that otherwise would have been allocated to CE level 1 have instead been allocated to CE level 0. Thus, CE level 0 has twice the number of resources allocated to it as it otherwise would. When resources are allocated in a configuration other than standard and/or when resources are reallocated by the eNB, the eNB can broadcast the updated configuration to all UEs within the system information message.

In some embodiments, the UE may determine its CE level, for example, by using a signal strength measurement such as an RSRP measurement. If the UE is attempting to transmit using CE, the UE can determine, based on the information transmitted from the eNB, that its appropriate CE level is not supported and/or does not have any resources allocated to it. If no resources are allocated to the UE's CE level, then the UE can change its CE level to a different CE level. For example, the UE may change its CE level to the next highest level where resources are available (as based on the information from the eNB).

In some embodiments, the eNB can check the state/condition of each CE level (e.g., checking the number of UEs operating on each individual CE level). This may be done by monitoring and classifying RSRP measurements reported from all the UEs. For example, the eNB may receive a number of RSRP measurements from the UEs in communication with the eNB. The eNB determines, based on the received measurements how many UEs are utilizing each of the CE levels. Based on this information, the eNB can smartly/dynamically allocate or re-allocate resources among the various CE levels to accommodate the distribution of UEs among the CE levels. For example, if there is a very high number of UEs utilizing CE level 4, then the eNB can smartly allocate or re-allocate additional resources to CE level 4. Alternatively, the eNB can create a new class, perhaps in a bandwidth that was previously unused, which is discussed in further detail with reference to FIG. 8 below.

In some such embodiments, the eNB may perform filtering or post-processing of the received measurement data prior to allocating or re-allocating resources. Such processing may include applying rules that dictate certain threshold levels for UE usage of particular CE levels. For example, CE level 2 may be limited to ten (10) UEs given a specific number of resources. If CE level 2 has twelve (12) UEs, then the eNB may need to allocate additional resources to CE level 2.

NB-IoT Coverage Enhancement Class Allocation Example

In some embodiments, the eNB's dynamic allocation may be based on the number of UE in each CE level, as discussed above. In some cases, one or more functions or algorithms may be used to relate the number of UEs and the size of resources allocated to the various CE levels. For example, in one configuration, a line function may be used.

The Narrow Band Internet of Things (NB-IoT) is under the process of being standardized under 3GPP. Three coverage classes cut from 144 dB to 164 dB Maximum Coupling Loss (MCL) have been defined, during the cellular-IoT study item phase, namely a basic coverage class (144 dB MCL), robust coverage (154 dB MCL) and extreme coverage (164 dB MCL). Thus, NB-IoT has up to 20 dB of coverage enhancement bandwidth, which is wider than the eMTC coverage enhancement, which is up to 15 dB. Dividing a 20 dB CE bandwidth into only three (3) classes may result in excessive use of PRACH resources and subsequent transmissions (i.e., requires more repetitions).

In order to use the PRACH resources more efficiently, NB-IoT coverage classes can be defined with finer granularity. Referring now to FIG. 8, a diagram 800 illustrates the proposed CE classes with finer granularity for NB-IoT. Alt 1 illustrates the suggested arrangement of three classes: one each at 144 dB, 154 dB and 164 dB MCL. Alt 2 illustrates an alternative arrangement where the higher bandwidths are left without classes and three classes are arranged at 144 dB, 149 dB and 154 dB MCL, respectively. This alternative may be used, for example, in situations where the eNB knows or has reason to believe that no UE are operating in extreme coverage modes within the cell. Alt 3 illustrates an alternative arrangement where the first, second, third and fifth CE bandwidths are assigned classes, but the fourth bandwidth is not assigned a class. This alternative Of course, there are various other alternatives wherein three, four or all five CE bandwidths are assigned classes as represented by Alt N.

Embodiments of the invention provide that the eNB has control for providing flexible coverage level class definition/assignment within the NB-IoT bandwidths. Thus, in some embodiments, more than three (3) coverage classes are defined and the eNB has flexibility to configure to either use all or only part of those defined coverage classes. This type of flexible allocation can happy dynamically. For example, the eNB can detect whether it needs to update its active coverage classes (e.g., by detecting that a high number of preamble transmissions are occurring in certain coverage class(es)). In order to update the UE on the latest active coverage classes, the eNB can broadcast the update to the UE (using the SIB information).

In other embodiments, the SIB information from the eNB to the UE contains active coverage classes and the PRACH resource allocation information. In these cases, the UEs may determine the coverage classes (e.g., the same procedures used by eMTC based on RSRP measurements).

In various embodiments, and referring back to FIG. 8, if the eNB chooses Alt 3, and a UE determines that it should use the 159 dB MCL coverage class, then the UE must select another class. For example, the UE may select the next highest available class—164 dB MCL.

Referring now to FIG. 9, a flow diagram illustrates a method 900 for selecting a Coverage Enhancement (CE) level from a plurality of CE levels, in accordance with embodiments of the invention. The first step, as represented by block 902, is determining, by a UE, a matching CE level for the UE. The matching CE level may be selected from a plurality of CE levels as discussed above based on measurements taken by the UE, such as an RSRP measurement. The next step, as represented by block 904, is for the UE to determine that the matching CE level is not defined in a CE configuration. In some cases, the CE configuration is provided to the UE by the base station. Alternatively, as represented by block 906, the UE determines that the matching CE level has no available allocated PRACH resources. This may be determined based on information transmitted from the base station. Next, as represented by block 908, the UE determines a new CE level from the plurality of CE levels. The new CE level is the next highest defined level with available resources. This may be done by using the CE configuration received from the base station and/or other information received from the base station. For example, the UE may match with the 154 dB MCL level based on the UE's RSRP measurement, but that level is not defined by the CE configuration received from the base station. In such a case, the UE can then select to transmit at the next highest CE level, which for example, may be the 159 dB MCL level. Finally, once the UE has selected a defined CE level with available resources, the UE can transmit using the determined new CE level, as represented by block 910.

Referring now to FIG. 10, a flow diagram illustrates a method for allocating Physical Random Access Channel (PRACH) resources to a plurality of Coverage Enhancement (CE) levels, in accordance with embodiments of the invention. The first step, as represented by block 1002, is for a base station to determine that a utilization of PRACH resources allocated to a first CE level (of a plurality of CE levels) is greater than an acceptable threshold. The acceptable threshold may be pre-established and stored in memory or may be dynamic and vary, for example, based on the number of defined CE levels. The next step, as represented by block 1004, is for the base station to determine, in response to determining the utilization rises above the threshold, that additional PRACH resources should be allocated to the first CE level of the plurality of CE levels. Finally, as represented by block 1006, the base station allocates additional PRACH resources to the first CE level.

In some embodiments, the base station may dynamically adjust the number of the defined CE levels in addition to, or instead of, allocation/re-allocating resources to CE levels. For example, if the base station determines that a CE level (in additional to those already defined) may be beneficial, then the base station may define an additional CE level and broadcast that information within a CE configuration transmission to the UEs within its cell.

CONCLUSION

Thus, systems, apparatus, methods, computer program products and the like described above provide for updating the CE (Coverage Enhancement)-level of a User Terminal (UE). The UE may be a NB IoT (Narrow Band Internet of Things) device, a MTC (Machine Type Communication) device or any other device supporting CE. Embodiments of the invention implement UE selection/re-selection of random access resources and/or base station allocation and/or re-allocation of resources between CE levels.

The invention is not limited to any particular types of devices of UEs, but rather may include NB IoT devices, MTC devices or other non-NB IoT or non-MTC devices that support CE and an absent time that has generated clock drift between the UE and the network. As used herein, a UE may also be referred to as a device, a system, or apparatus. Examples of UEs include any everyday object configured for network connectivity.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for selecting a Coverage Enhancement (CE) level from a plurality of CE levels, the method comprising:
   identifying, by a User Equipment (UE), a Coverage Enhancement (CE) level from a plurality of CE levels by matching a Maximum Coupling Loss (MCL) coverage class to a Reference Signal Received Power (RSRP) measurement;
   determining, by the UE, that the identified CE is not defined in a CE configuration received from a Base Station (BS);
   in response to determining that the CE level is not defined in the CE configuration, determining, by the UE, a new CE level from the plurality of CE levels, wherein the new CE level is a next highest available CE level from the plurality of CE levels; and
   transmitting, by the UE, using the determined new CE level.

2. The method of claim 1, further comprising determining, by the UE, that the identified CE level is (i) not defined in the CE configuration received from the BS, and (ii) has no available allocated PRACH resources based on information received from the BS.

3. The method of claim 2, further comprising receiving the CE configuration from the BS, wherein the CE configuration indicates a number of CE levels in the plurality of CE levels and random access resource allocations (time/frequency) corresponding to each of the number of CE levels.

4. The method of claim 1, wherein identifying the CE level comprises:
   performing, at the UE, Reference Signal Received Power (RSRP) measurement.

5. A user equipment (UE) apparatus for selecting a Coverage Enhancement (CE) level from a plurality of CE levels, the apparatus comprising:
   a computing platform including a memory and a processor in communication with the memory; and
   an application stored in the memory, executable by the processor, and configured to:
      identify a Coverage Enhancement (CE) level from a plurality of CE levels by matching a Maximum Coupling Loss (MCL) coverage class to a Reference Signal Received Power (RSRP) measurement;
      determine that the identified CE is not defined in a CE configuration received from a Base Station (BS);

in response to determining that the CE level is not defined in the CE configuration, determine a new CE level from the plurality of CE levels, wherein the new CE level is a next highest available CE level from the plurality of CE levels; and transmit using the determined new CE level.

6. The UE apparatus of claim 5, wherein the application is further configured to determine that the identified CE level (i) is not defined in the CE configuration received from the BS, and (ii) has no available allocated PRACH resources based on information received from the BS.

7. The UE apparatus of claim 6, wherein the application is further configured to receive the CE configuration from the BS, wherein the CE configuration indicates a number of CE levels in the plurality of CE levels and random access resource allocations (time/frequency) corresponding to each of the number of CE levels.

8. The UE apparatus of claim 5, wherein determining the matching CE level comprises:

performing Reference Signal Received Power (RSRP) measurement.

* * * * *